United States Patent [19]
Kim et al.

[11] Patent Number: 6,001,509
[45] Date of Patent: Dec. 14, 1999

[54] SOLID POLYMER ELECTROLYTES

[75] Inventors: Dong-Won Kim; Young-Roak Kim; Boo-Keun Oh, all of Daejeon; Chang-Woo Baek, Taeku, all of Rep. of Korea

[73] Assignee: Samsung Display Devices Co., Ltd., Suwon, Rep. of Korea

[21] Appl. No.: 08/971,919

[22] Filed: Nov. 18, 1997

[30] Foreign Application Priority Data

Nov. 8, 1996 [KR] Rep. of Korea ............ 96-54809
Apr. 25, 1997 [KR] Rep. of Korea ............ 96-15552
Jun. 3, 1997 [KR] Rep. of Korea ............ 97-22924

[51] Int. Cl.⁶ ............................................. H01M 6/18
[52] U.S. Cl. ................ 429/309; 429/129; 429/304; 429/322
[58] Field of Search ................ 429/31, 101–102, 429/192

[56] References Cited

U.S. PATENT DOCUMENTS 4,556,614  12/1985  Le Mehaute et al. ............ 429/191
5,219,679  6/1993  Abraham et al. .
5,407,581  4/1995  Onodera et al. ............ 210/654
5,491,041  2/1996  Abraham et al. .
5,510,209  4/1996  Abraham et al. ............ 429/192
5,532,083  7/1996  McCullough ............ 429/210
5,540,741  7/1996  Gozdz et al. .
5,585,039  12/1996  Matsumoto et al. ............ 252/500

FOREIGN PATENT DOCUMENTS 0 279 554 A2  8/1988  European Pat. Off. .

*Primary Examiner*—Maria Nuzzolillo
*Assistant Examiner*—Mark Rothkosky
*Attorney, Agent, or Firm*—Staas & Halsey LLP

[57] ABSTRACT

A solid polymer electrolyte according to the present invention comprises a polymer (A), and a liquid electrolyte (B) composed of a lithium salt and an aprotic solvent, optionally and a ceramic filler (C). The polymer (A) is poly (acrylonitrile-methyl methacrylate), poly(acrylonitrile-methyl methacrylate-oligooxyethylene ethylether methacrylate) or poly(acrylonitrilc-methyl methacrylate-styrene). The polymer (A) is poly(acrylonitrile methyl methacrylate) containing acrylonitrile of 10~90 mol %, preferably 26~46 mol %, poly(acrylonitrile-methyl methacrylate-oligooxyethylene ethylether methacrylate) containing acrylonitrile of 20~80 mol %, methyl methacrylate of 20~80 mol % and oligooxyethylene ethylether methacrylate of 5~20 mol %, and poly(acrylonitrile-methyl methacrylate-styrene) containing acrylonitrile of 10~80 mol %, methyl methacrylate of 10~60 mol % and styrene of 5~50 mol %.

19 Claims, 6 Drawing Sheets

SOLID POLYMER ELECTROLYTES

FIELD OF THE INVENTION

The present invention relates to a solid polymer electrolyte or use in an electrochemical device such as a lithium secondary battery, a capacitor, an electrochromic device, etc. More particularly, the present invention relates to a solid polymer lectrolyte composed of a polymer, a lithium salt and an aprotic solvent, wherein the polymer is selected from copolymers of poly(acrylonitrile-methyl methacrylate), poly(acrylonitrile-methyl methacrylate-oligooxyethylene ethylether methacrylate), and poly(acrylonitrile-methyl methacrylate-styrene). The solid polymer electrolytes of the present invention may further include a ceramic filler.

BACKGROUND OF THE INVENTION

The development of a secondary battery is among the main concerns of modern industry and society due to the fast development of electronic industry, computer architecture and telecommunication. Especially, electronic goods are becoming smaller and more portable so that a secondary battery which is a part thereof also requires to be thinner and smaller. The most interested battery is a lithium polymer secondary battery which can remove the disadvantages of a lithium ion battery using a liquid electrolyte. The lithium polymer secondary battery has advantages in safety, low cost for preparation, manufacture of a large scale of battery, no limitations to the size or shape of battery, etc. Accordingly, a solid polymer electrolyte for a lithium polymer secondary battery has been researched and developed. Generally, the solid polymer electrolyte has excellent characteristics of a low electron conductivity, a low self-discharge, a high admissibility between electrode and electrolyte, and a coating ability of a large surface area.

Recently, most of researches are related to a plasticized polymer electrolyte which is prepared by adding a liquid electrolyte to a polymer matrix. Polymers used for the polymer matrix are poly(ethylene oxide), polyacrylonitrile, poly(vinylidene fluoride), poly(vinyl chloride), etc.

European Patent Publication No. 0279554A2 discloses a polymer electrolyte comprising a complex of a solid polymer and an alkali metal salt, which polymer is capable of forming donor acceptor type bonds with alkali metal ions and is capable of conducting alkali metal ions, characterized in that the complex is associated with a mixture of more than one substituted or unsubstituted 1,3-dioxolane-2-ones. In the patent, poly(ethylene oxide) or poly(propylene oxide) is used as a solid polymer. However, as the glass transition temperature of poly(ethylene oxide) used as a solid polymer is low, the polymer electrolyte film is sticky and therefore it is difficult to handle the film.

U.S. Pat. No. 5,219,679 discloses solid electrolytes composed of solutions of alkali metal salts in a plurality of mixible aprotic organic liquids immobilized in an organic solid polymer matrix which itself can complex with said alkali metal salts, wherein said liquids are ethylene carbonate and propylene carbonate and said polymer is selected from the group consisting of polyacrylonitrile and poly-N-vinyl-2-pyrolidinone. The polymer electrolyte shows a high ionic conductivity of the order of $10^{-3}$ S/cm. However, as polyacrylonitrile is insoluble in an organic solvent, the solid polymer electrolyte should be prepared at a high temperature over 10° C. Also, the polymer matrix has a poor compatibility with the liquid electrolyte so as to occur a phase separation phenomenon which will cause leak out the organic solvent, so called "exudation". The exudation of an organic solvent will result in a serious problem of safety.

Japanese Patent Laid open No. 07-331019 discloses a polymer electrolyte comprising a polymer matrix containing polyacrylonitrile, polybutadiene or polystyrene, such as styrene butadiene rubber polymer, acrylonitrile-butadiene copolymer and acrylonitrile styrene copolymer; a lithium salt such as lithium perchlorate; and an aprotic solvent such as ethylene carbonate and diethyl carbonate. The polymer electrolyte has a high ionic conductivity over $4.0 \times 10^{-3}$ S/cm at 25° C., when the polymer electrolyte contains 90% or more of the liquid electrolyte. The polymer matrix has a poor compatibility with the aprotic solvent so as to occur a phase separation phenomenon. Addition of a liquid electrolyte to the polymer matrix in order to obtain a high conductivity over $10^{-3}$ S/cm will cause a poor physical property not so as to prepare an electrolyte film having 100 μm or less.

Accordingly, the present inventors have developed a solid polymer electrolyte having excellent physical properties for preparing a thin electrolyte film and an excellent ionic conductivity, which comprises a polymer complex of poly(acrylonitrile-methyl methacrylate), an aprotic solvent and a lithium salt.

Also, the present inventors have developed a polymer matrix whose polymer is poly(acrylonitrile methyl methacrylate oligooxyethylene ethylether methacrylate), or poly(acrylonitrile methylmethacrylate styrene).

OBJECTS OF THE INVENTION

An object of the present invention is to provide a solid polymer electrolyte comprising a copolymer containing acrylonitrile component and a liquid electrolyte, which has excellent mechanical properties and an excellent ionic conductivity.

Another object of the invention is to provide a solid polymer electrolyte comprising a copolymer containing a certain amount of acrylonitrile component and a liquid electrolyte, thereby the copolymer having a good compatibility with the liquid electrolyte.

A further object of the invention is to provide a solid polymer electrolyte comprising a copolymer containing acrylonitrile component, a liquid electrolyte and a ceramic filler, thereby the copolymer having a good dimensional stability.

A further object of the present invention is to provide a solid polymer electrolyte which inhibits the exudation phenomenon of an organic solvent.

A further object of the present invention is to provide a solid polymer electrolyte which can provide a good formability of an electrolyte film.

Other objects and advantages of this invention will be apparent from the ensuing disclosure and appended claims.

SUMMARY OF THE INVENTION

A solid polymer electrolyte according to the present invention comprises a polymer (A), and a liquid electrolyte (B) composed of a lithium salt and an aprotic solvent, optionally and a ceramic filler (C). The polymer (A) is poly(acrylonitrile-methyl methacrylate), poly(acrylonitrile methyl methacrylate oligooxyethylene ethylether methacrylate) or poly(acrylonitrile-methyl methacrylate-styrene).

In case that the polymer (A) is poly(acrylonitrile-methyl methacrylate), the solid polymer electrolyte comprises 50~90% by weight of a polymer (A) of poly(acrylonitrile methyl methacrylate) which contains acrylonitrile of 10~90 mol %, preferably 26~46 mol %, and 50~10% by weight of a liquid electrolyte (B) which is composed of a lithium salt and an aprotic solvent, optionally and a ceramic filler (C) of 5~40% by weight per the total weight of polymer (A) and liquid electrolyte (B).

In case that the polymer (A) is poly(acrylonitrile methyl methacrylate oligooxyethylene ethylether methacrylate), the solid polymer electrolyte comprises 10~90% by weight of a polymer (A) of poly(acrylonitrile methyl methacrylate oligooxyethylene ethylether methacrylate) which contains acrylonitrile of 20~80 mol %, methyl methacrylate of 20~80 mol % and oligooxyethylene ethylether methacrylate of 5~20 mol %, and 90~10% by weight of a liquid electrolyte (B) which is composed of a lithium salt and an aprotic solvent.

In case that the polymer (A) is poly(acrylonitrilc-methyl methacrylate-styrene), the solid polymer electrolyte comprises 10~90% by weight of a polymer (A) of poly (acrylonitrile-methyl methacrylate-styrene) which contains acrylonitrile of 10~80 mol %, methyl methacrylate of 10~60 mol % and styrene of 5~50 mol %, and 90~10% by weight of a liquid electrolyte (B) which is composed of a lithium salt and an aprotic solvent.

Representative examples of the lithium salt used for a liquid electrolyte in the present invention are lithium perchlorate($LiClO_4$), lithium trifluoromethansulfonimide ($LiN(CF_3SO_2)_2$), lithium hexafluorophosphate($LiPF_6$), lithium tetrafluoroborate($LiBF_4$), lithium trifluoromethansulfonate($LiCF_3SO_3$) and lithium hexafluoroarsenate($LiAsF_6$).

Examples of the aprotic solvent used for a liquid electrolyte in the present invention are ethylene carbonate, propylene carbonate, dimethylcarbonate, diethylcarbonate, dimethoxy ethane, diethoxy ethane, polyethyleneglycol dimethylether, γ-butyrolactone and tetrahydrofuran.

The polymer for a polymer matrix in this invention is dissolved in an organic solvent such as tetrahydrofuran prior to preparing a solid polymer electrolyte.

For improvement of dimensional stability of the solid polymer electrolyte, a ceramic filler is optionally added to the polymer electrolyte. The ceramic filler is selected from the group consisting of silica, alumina, lithium aluminate and zeolite, and a mixture thereof.

The terpolymers prepared in accordance with the present invention are dissolved in tetrahydrofuran, and a liquid electrolyte is added to the terpolymer solution. If the polymer and liquid electrolyte are perfectly mixed, a polymer solution having a high viscosity is prepared. The polymer solution is cast by pouring the solution onto a glass plate or a resin plate to form a polymer electrolyte film. The polymer electrolyte film is dried at room temperature to remove tetrahydrofuran, and then a solid polymer electrolyte film having a thickness of 50~200 μm is obtained.

DETAILED DESCRIPTION OF THE PREFERRED EMBODIMENTS

(1) Poly(acrylonitrile-methyl methacrylate)

A polymer for a solid polymer electrolyte according to the present invention is poly(acrylonitrile-methyl methacrylate). Thus, the solid polymer electrolyte comprise 50~90% by weight of a polymer (A) of poly(acrylonitrile-methyl methacrylate) and 50~10% by weight of a liquid electrolyte (B) composed of a lithium salt and an aprotic solvent. In case that the dimensional stability of the polymer electrolyte is not good, a ceramic filler such as silica can be added.

As mentioned above, poly(acrylonitrile) has so a poor compatibility with a liquid electrolyte as to occur a phase separation phenomenon which will cause leak out the organic solvent, so called "exudation". Accordingly, in this embodiment, a carbonyl grout) (—COO—) is introduced to the poly(acrylonitrile) to give a poly(acrylonitrile-methyl methacrylate). The carbonyl group provides the poly (acrylonitrile-methyl methacrylate) with a good compatibility with an aprotic solvent.

Poly(methyl methacrylate) is widely used in this field, which is cheap. The polymer has an amorphous structure so as to absorb a lot of a liquid electrolyte. In this embodiment of the present invention, the poly(acrylonitrile-methyl methacrylate) has characteristics of both poly(acrylonitrile) and poly(methyl ethacrylate).

In this invention, the poly(acrylonitrile-methyl methacrylate) as a polymer matrix is prepared from copolymerization of acrylonitrile and methyl methacrylate. The acrylonitrile and methyl methacrylate are copolymerized by using azobisisobutylonitrile as an initiator in a solvent of dimethylformamide. The content of acrylonitrile in the polymer is 10~90% by mole and preferably, 26~46% by mole. It is preferable that the molecular weight of the polymer is in the range of 30,000 to 170,000. Poly(acrylonitrile-methyl methacrylate) of 90~50% by weight is employed in preparing a solid polymer electrolyte according to the present invention. The polymer is dissolved in an organic solvent prior to preparing a solid polymer electrolyte. The organic solvent should dissolve well the polymer, have a low boiling point so as to be removed in a short time after film-casting, and have a low viscosity so as to shorten the process time for preparation. Further, the organic solvent should have a low price for mass manufacture and be free from environmental contamination. Acetone and tetrahydrofuran are used as cosolvents in this invention. The poly(acrylonitrile-methyl methacrylate) is dissolved in an organic solvent, and then mixed with a liquid electrolyte. The structural formula (I) of poly(acrylonitrile-methyl methacrylate) is shown as below:

(I)

where $R_1$ is H or $CH_3$, and $R_2$ is an alkyl group.

(2) Poly(acrylonitrile-methyl methacrylate-oligooxyethylene ethylether methacrylate)

Another polymer for a solid polymer electrolyte of the present invention is a random terpolymer composed of polyacrylonitrile, polymethacrylate and poly(oligooxyethylene ethylether methacrylate). The structural formula (II) of poly(acrylonitrile-methyl methacrylate-oligooxyethylene ethylether methacrylate) is shown as below:

(II)

where $R_1$ is H or $CH_3$, $R_2$ is an alkyl group, and n is an integer of 1~12.

In the terpolymer in accordance with this embodiment, the acrylonitrile unit plays a role for maintaining the good physical properties when an organic solvent is added to the terpolymer, the methyl methacrylate unit plays a role for improving the ion conductivity by increasing the amorphous portion of the polymer electrolyte and for inhibiting the exudation of an organic solvent during the charge/discharge cycle by providing a good compatibility with the organic solvent, and the oligooxycthylenc ethylether methacrylate provides an ability of an ion dissociation so as to reduce the amount of the organic solvent which is added to improve the ionic conductivity.

In preparation of the poly(acrylonitrile-methyl methacrylate-oligooxyethylene ethylether methacrylate), azobisisobutylonitrile is used as an initiator. The polymerization is carried out in a solvent of dimethyl formamide. The poly(acrylonitrilc-methyl methacrylate-oligooxyethylene ethylether methacrylate) contains acrylonitrile of 20~80 mol %, methyl methacrylate of 20~80 mol % and oligooxyethylene ethylether methacrylate of 5~20 mol %. For both ionic conductivity and physical property, the terpolymer contains preferably acrylonitrile of 20~50 mol %, methyl methacrylate of 50~80 mol % and oligooxyethylene ethylether methacrylate of 5~20 mol %. It is preferable that the molecular weight of the terpolymer is in the range of 100,000 to 500,000.

The terpolymer is dissolved in an organic solvent prior to the preparation of a solid polymer electrolyte. The organic solvent utilized in the present invention is tetrahydrofuran.

(3) Poly(acrylonitrile-methyl methacrylate-styrene)

Another polymer for a solid polymer electrolyte of the present invention is a random terpolymer composed of poly(acrylonitrile), poly(methyl methacrylate) and poly(styrene). In the terpolymer of this embodiment, the acrylonitrile unit plays a role for maintaining the good physical properties when an organic solvent is added to the terpolymer, the methyl methacrylate unit plays a role for improving the ionic conductivity by increasing the amorphous portion of the polymer electrolyte and for inhibiting the exudation of an organic solvent during the charge/discharge cycle by providing a good compatibility with the organic solvent, and the styrene unit can be dissolved in an organic solvent and can contribute a low manufacturing cost of the polymer electrolyte because styrene is cheap. In preparation of the terpolymer, potassium persulfate ($K_2S_2O_8$) is used as an initiator. The polymerization is carried out in distilled water. The terpolymer is composed of acrylonitrile of 10~80% by mole, methyl methacrylate of 10~60% by mole, and styrene of 5~50% by mole. The molecular weight of the copolymer is preferably in the range of 500,000 to 1,000,000.

Poly (acrylonitrile-methyl methacrylate-styrene) terpolymer is an example of one of the polymers respresented by the following structural formula (III)".

(III)

where $R_1$ is H or $CH_3$, $R_2$ is an alkyl group, and X is $C_6H_5$, Cl, F, ($n = 1 \sim 12$).

Each polymer according to the present invention is used with a liquid electrolyte. The liquid electrolyte is composed of an lithium salt and an aprotic solvent.

Examples of the lithium salt are lithium perchlorate ($LiClO_4$), lithium trifluoromethansulfonimide($LiN(CF_3SO_2)_2$), lithium hexafluorophosphate($LiPF_6$), lithium tetrafluoroborate($LiBF_4$), lithium trifluoromethansulfonate ($LiCF_3SO_3$), and lithium hexafluoroarsenate($LiAsF_6$).

Examples of the aprotic solvent are ethylene carbonate, propylene carbonate, dimethylcarbonate, diethylcarbonate, dimethoxy ethane, diethoxy ethane, polyethyleneglycol dimethylether, γ-butyrolactone, and tetrahydrofuran.

For improving dimensional stability of the solid polymer electrolyte, a ceramic filler (C) is added to the solution of a polymer (A) and a liquid electrolyte (B), which will provide the solid polymer electrolyte with a mechanical strength. Examples of the ceramic filler are silica, alumina and lithium aluminate. The ceramic filler is used in the amount of 5~40 parts by weight per 100 parts by weight of the total amount of the polymer (A) and liquid electrolyte (B).

The solid polymer electrolyte in accordance with the present invention is prepared by a conventional method, which will be easily carried out by an ordinary skilled person in the art. A polymer (A) is dissolved in an organic solvent, and then a liquid electrolyte (B) is added to the solution. A sticky polymer solution is formed through a complete mixing the polymer and liquid electrolyte. The sticky polymer solution is cast by pouring the solution onto a Teflon plate or a glass plate. The cast solid polymer electrolyte is dried at room temperature for over 3 hours, the organic solvent is removed, and finally a thin film of a solid polymer electrolyte is obtained.

The solid polymer electrolyte according to the present invention can be absorbed in a microporous film which is prepared from a synthesized resin such as polyethylene and polypropylene, which will be easily carried out by an ordinary skilled person in the art.

The present invention has an effect to prepare a solid polymer electrolyte which is able to inhibit the exudation phenomenon of an organic solvent, and which has excellent mechanical properties, an excellent ionic conductivity, and a good compatibility with a liquid electrolyte.

The solid polymer electrolyte according to the present invention can be utilized for a lithium polymer secondary battery, capacitor, sensors and display devices.

The present invention may be better understood by reference to the following examples which are intended for purposes of illustration and are not to be construed as in any way limiting the scope of the present invention, which is defined in the claims appended hereto.

EXAMPLES

Each of the components used in the following examples is illustrated as follows:

A. Polymer Matrices (1) Poly(acrylonitrile-methyl methacrylate)

Poly(acrylonitrile -methyl methacrylate) was prepared by polymerization of acrylonitrile and methyl methacrylate in a solvent of dimethylformamide, using azobisisobutylonitrile as an initiator.

(2) Poly(acrylonitrile-methyl methacrylate-oligooxyethylene ethylether methacrylate)

Poly(acrylonitrile-methyl methacrylate-oligooxyethylene ethylether methacrylate) was prepared by polymerization of acrylonitrile, methyl methacrylate and oligooxyethylene ethylether methacrylate in a solvent of dimethyl formamide, using azobis isobutylonitrile as an initiator.

(3) Poly(acrylonitrile-methyl methacrylate-styrene)

Poly(acrylonitrile-methyl methacrylate-styrene) was prepared by polymerization of acrylonitrile, methyl methacrylate and styrene in distilled water, using $K_2S_2O_8$ as an initiator.

B. Liquid Electrolyte

A liquid electrolyte used in this examples was prepared by dissolving a lithium salt in a solvent which was a mixture of ethylene carbonate and a second aprotic solvent in the volume ratio of 1:1.

C. Ceramic Filler

Ceramic fillers used in the present invention to improve the mechanical property of the solid polymer electrolyte were silica, alumina and lithium aluminate.

Example 1

A polymer of 50% by weight of poly(acrylonitrile-methyl methacrylate) containing acrylonitrile of 26% by mole was perfectly dissolved in acetone. A liquid electrolyte of 50% by weight was added to the polymer solution and mixed. A sticky polymer solution for a solid polymer electrolyte was obtained. The sticky polymer solution was cast onto a glass plate, and dried to remove the organic solvent. Therefore, a solid polymer electrolyte was prepared. The solid polymer electrolyte was punched to make a test sample having a diameter of 12 mm. The ionic conductivity (σ) of the test sample was measured by AC impedance analyzer and was found to be $2.7 \times 10^{-4}$ S/cm at room temperature.

Example 2

Two solid polymer electrolytes were prepared in the same manner as described in Example 1 except that the poly (acrylonitrile-methyl methacrylate) contains acrylonitrile of 46% and 64% by mole, respectively. The ionic conductivities (σ) of the electrolytes were $3.9 \times 10^{-4}$ S/cm and $5.2 \times 10^{-4}$ S/cm, respectively, at room temperature.

Example 3

Figure 1:
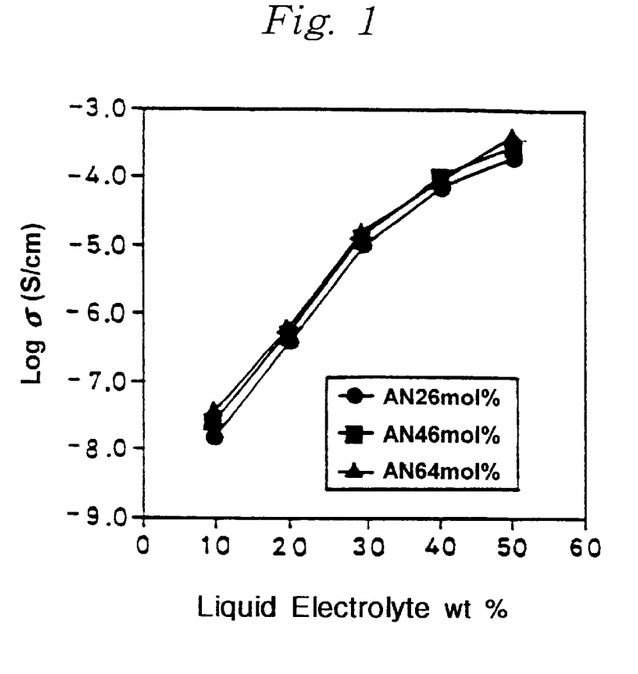
FIG. 1 is a graph showing the ionic conductivities (σ) of the solid polymer electrolytes depending upon the content of acrylonitrile of poly(acrylonitrile-methyl methacrylate) and upon the content of liquid electrolyte in accordance with Example 3.

Solid polymer electrolytes were prepared in the same manner as described in Example 1 except that the poly (acrylonitrile-methyl methacrylate) contains acrylonitrile of 26%, 46% and 64% by mole, respectively, and that the content of the liquid electrolyte was varied. The ionic conductivities of the electrolytes were presented in FIG. 1.

Example 4

Silica of 5 parts by weight was added to 100 parts of the sticky polymer solution of Example 1. A solid polymer electrolyte was prepared in the same manner as described in Example 1. The ionic conductivity ($\sigma$) of the electrolyte was measured by AC impedance analyzer and was found to be $2.5 \times 10^{-4}$ S/cm at room temperature.

Example 5

Two solid polymer electrolytes were prepared in the same manner as described in Example 4 except that the poly (acrylonitrile methyl-methacrylate) contains acrylonitrile of 46% and 64% by mole, respectively. The ionic conductivities ($\sigma$) of the electrolytes were $3.6 \times 10^{-4}$ S/cm and $4.8 \times 10^{-4}$ S/cm, respectively, at room temperature.

Example 6

Figure 2:
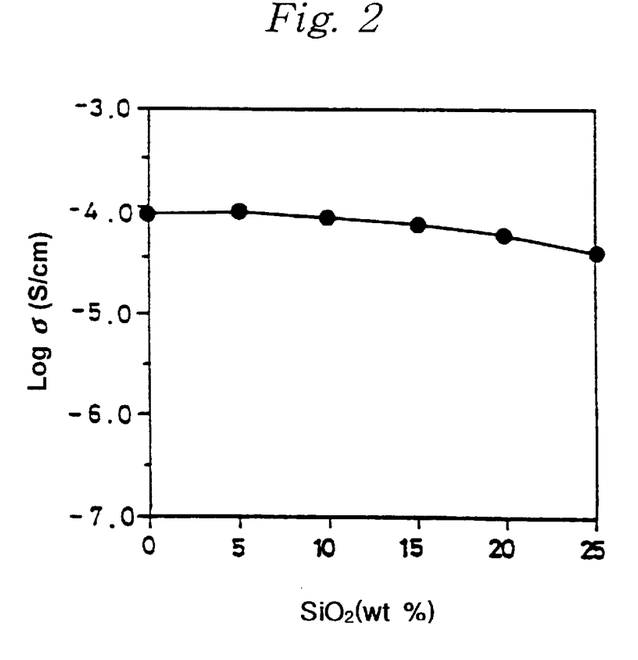
FIG. 2 is a graph showing the ionic conductivities (σ) of the solid polymer electrolytes depending upon the content of silica ($SiO_2$) in Example 6, wherein the solid polymer electrolyte comprises a polymer of poly(acrylonitrile methyl methacrylate), a liquid electrolyte and a ceramic filler of silica ($SiO_2$)

Solid polymer electrolytes were prepared in the same manner as described in Example 4 except that the poly (acrylonitrile-methyl methacrylate) contains acrylonitrile of 46% by mole, and that the content of the ceramic filler was varied. The ionic conductivities of the electrolytes were presented in FIG. 2. The solid polymer electrolytes showed excellent ionic conductivities and physical properties.

Figure 3:
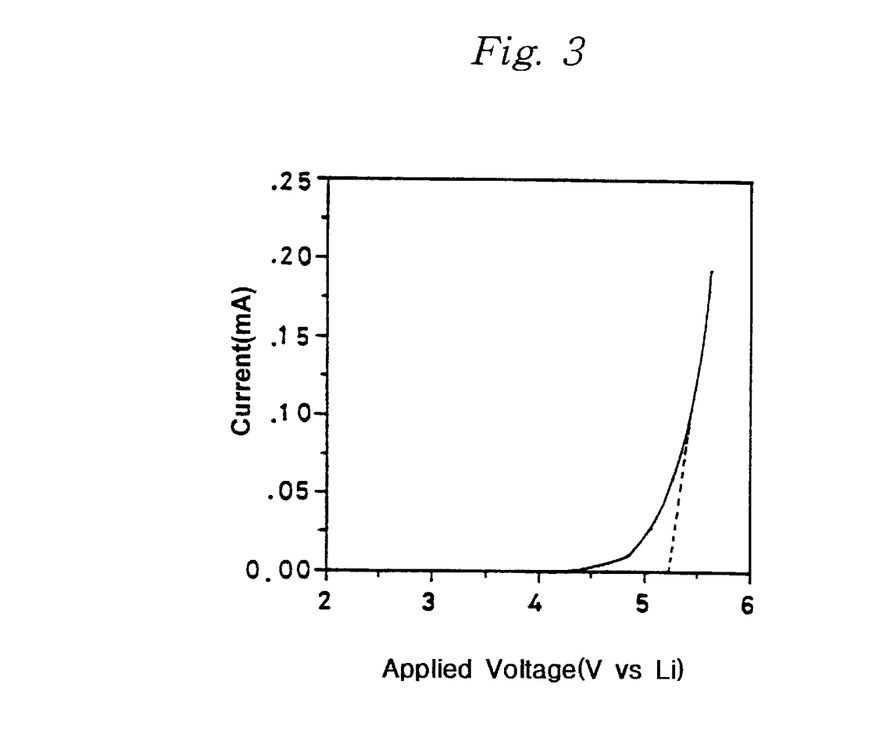
FIG. 3 is a graph showing the linear sweep voltammetry of the solid polymer electrolyte comprising a polymer of poly(acrylonitrile-methyl methacrylate), a liquid electrolyte and a ceramic filler of silica.

Electrochemical stability was observed by a linear sweep voltammetry. The result of the linear sweep voltammetry was shown in FIG. 3. In the voltammetry, lithium electrodes were used for a counter electrode and for a reference electrode and a stainless electrode was used for a working electrode. The electrolytes were stable until the voltage was up to 5.24 V when a lithium electrode was used for a reference electrode.

Comparative Example 1

Poly(methyl methacrylate) of 50% by weight, having the molecular weight of 120,000, and liquid electrolyte of 50% by weight were mixed. Acetone as solvent was added to the mixture to give a sticky polymer solution. The sticky polymer solution was cast onto a glass plate, and dried to remove the organic solvent. Therefore, a solid polymer electrolyte was prepared. The ionic conductivity of the solid polymer electrolyte was $1.2 \times 10^{-4}$ S/cm at room temperature, which was lower than that of the solid polymer electrolyte using poly(acrylonitrile-methyl methacrylate). As poly(methyl methacrylate) had a good compatibility with an organic solvent, the solid polymer electrolyte was very sticky.

Comparative Example 2

Poly(acrylonitrile) of 50% by weight, having the molecular weight of 70,000, and liquid electrolyte of 50% by weight were mixed. Dimethylformamide as solvent was added to the mixture, stirring the mixture, to give a sticky polymer solution. The sticky polymer solution was cast onto a glass plate, and dried to remove the organic solvent. Therefore, a solid polymer electrolyte was prepared. The ionic conductivity of the solid polymer electrolyte was $6.5 \times 10^{-4}$ S/cm at room temperature, which was higher than those of the solid polymer electrolytes prepared in the Examples above. However, as the organic solvent has the boiling point of 153° C., it took a long time to remove it from the solid polymer electrolyte. The liquid electrolyte was evaporated during removal of the organic solvent, so it was difficult to keep the required content of liquid electrolyte in the solid polymer electrolyte. It was also observed that the liquid electrolyte leaked out from the solid polymer electrolyte.

Example 7

Terpolymer of 50% by weight, containing acrylonitrile, methyl methacrylate and oligooxyethylene ethylether methacrylate of 11%, 79% and 10% by mole, respectively, was dissolved in tetrahydrofuran, and liquid electrolyte of 50% by weight was added. A sticky polymer solution was obtained by stirring the solution. The sticky polymer solution was cast onto a glass plate, and dried to remove the organic solvent. Therefore, a solid polymer electrolyte was prepared. The solid polymer electrolyte was cut to be the size of 2 cm×2 cm. The ionic conductivity of the electrolyte as $5.3 \times 10^{-4}$ S/cm at room temperature.

Example 8

Figure 4:
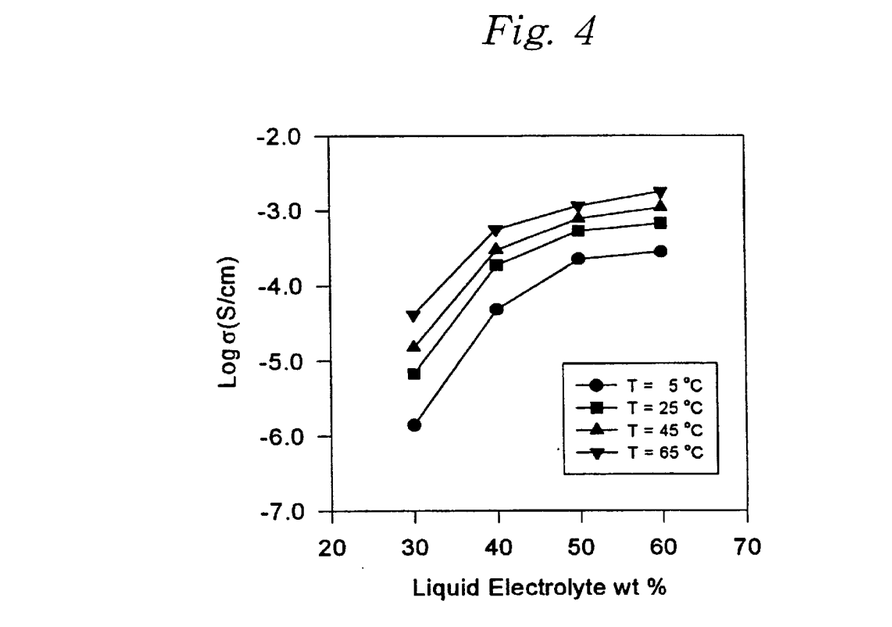
FIG. 4 is a graph showing the ionic conductivities (σ) of the solid polymer electrolyte depending upon the content of liquid electrolyte in Example 8, wherein the solid polymer electrolyte comprises a polymer of poly(acrylonitrile methyl methacrylate-oligooxyethylene ethylether methacrylate) composed of acrylonitrile of 11%, methyl methacrylate of 79% and oligooxyethylene ethylether methacrylate of 10%, and a liquid electrolyte.

Solid polymer electrolytes were prepared in the same manner as described in Example 7 except that the content of the liquid electrolyte was varied. The ionic conductivities of the electrolytes were presented in FIG. 4.

Example 9

Solid polymer electrolytes were prepared in the same manner as described in Example 7 except that the terpolymer contains acrylonitrile, methyl methacrylate and oligooxyethylene ethylether methacrylate of 23%, 69% and 8% by mole, respectively. The ionic conductivity of the solid polymer electrolyte was $4.9 \times 10^{-4}$ S/cm at room temperature.

Example 10

Silica of 5 parts by weight was added to 100 parts of the sticky polymer solution of Example 9. A solid polymer electrolyte was prepared in the same manner as described in Example 9. The ionic conductivity ($\sigma$) of the electrolyte was measured by AC impedance analyzer and was found to be $4.5 \times 10^{-4}$ S/cm at room temperature.

Example 11

Figure 5:
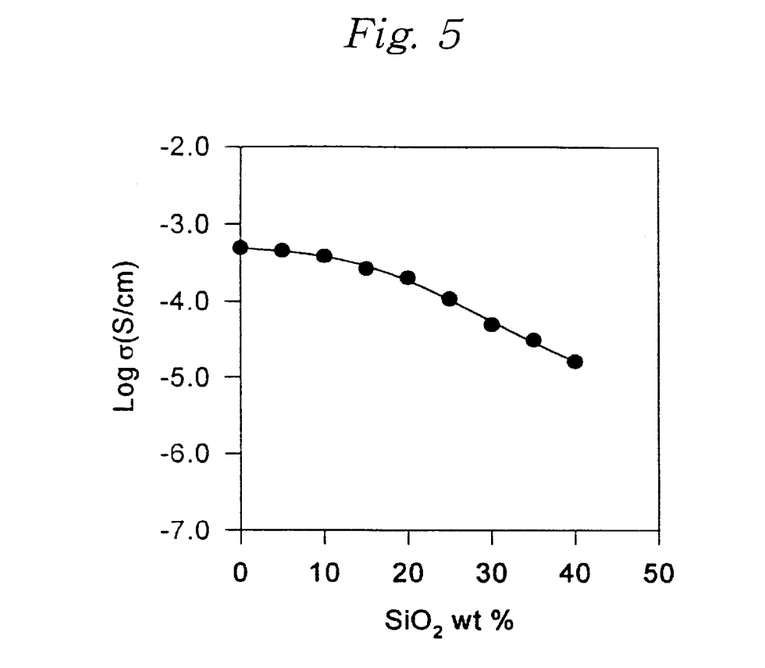
FIG. 5 is a graph showing the ionic conductivities (σ) of the solid polymer electrolyte depending upon the content of silica ($SiO_2$) in Example 11, wherein the solid polymer electrolyte comprises a polymer of poly(acrylonitrile-methyl methacrylate), a liquid electrolyte and a ceramic filler of silica.

Silica was added to the sticky polymer solution of Example 9, varying the content of silica. Solid polymer electrolytes were prepared in the same manner as described in Example 9. The ionic conductivities of the electrolytes were presented in FIG. 5.

Figure 6:
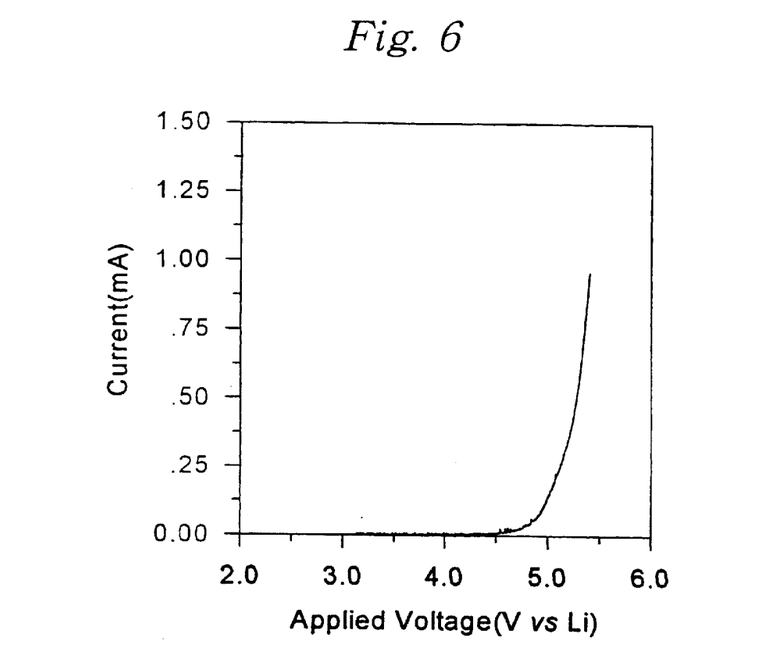
FIG. 6 is a graph showing the linear sweep voltammetry of the solid polymer electrolyte comprising a polymer of poly(acrylonitrile-methyl methacrylate-oligooxyethylene ethylether methacrylate), a liquid electrolyte and a ceramic filler of silica.

Electrochemical stability was observed by a linear sweep voltammetry. The result of the linear sweep voltammetry was shown in FIG. 6. In the voltammetry, lithium electrodes were used for a counter electrode and for a reference electrode and a stainless electrode was used for a working electrode. The electrolytes were stable until the voltage was up to 5.1 V when a lithium electrode was used for a reference electrode.

Example 12

Silica of 5 parts by weight was added to 100 parts of the sticky polymer solution of Example 9. A solid polymer electrolyte was prepared in the same manner as described in Example 9 except that lithium aluminate of 20 parts by weight was added instead of silica of 5 parts by weight to 100 parts of the sticky polymer solution. The ionic conductivity of the electrolyte was $3.0 \times 10^{-4}$ S/cm at room temperature.

Example 13

Terpolymer of 30% by weight, containing acrylonitrile, methyl methacrylate and oligooxyethylene ethylether methacrylate of 11%, 79% and 10% by mole, respectively, was dissolved in tetrahydrofuran, and liquid electrolyte of 70% by weight was added. A sticky polymer solution was obtained by stirring the solution. A polyolefin microporous film, Celgard 2300, having the thickness of 25 μm was immersed in the sticky polymer solution for 30 minutes. The polyolefin microporous film was dried to obtain a gel type polymer electrolyte. The solid polymer electrolyte had the thickness of 100 μm. The ionic conductivity of the sample wais $5.6 \times 10^{-4}$ S/cm at room temperature.

Example 14

Terpolymer of 20% by weight, containing acrylonitrile, methyl methacrylate and styrene of 57%, 27% and 16% by mole, respectively, was dissolved in tetrahydrofuran, and liquid electrolyte of 80% by weight composed of 1M lithium perchlorate and ethylene carbonate/propylene carbonate was added. A sticky polymer solution was obtained by stirring the solution. The sticky polymer solution was cast onto a release paper by using a doctor blade, and which was dried to remove tetrahydrofuran to prepare a solid polymer electrolyte. The solid polymer electrolyte was cut to be the size of 2 cm×2 cm. The ionic conductivity of the sample was $1.3 \times 10^{-4}$ S/cm at room temperature.

Electrochemical stability was observed by a linear sweep voltammetry. In the voltammetry, lithium electrodes were used for a counter electrode and for a reference electrode and a stainless electrode was used for a working electrode. The electrolytes were stable until the voltage was up to 4.8 V when a lithium electrode was used for a reference electrode.

Example 15

Figure 7:
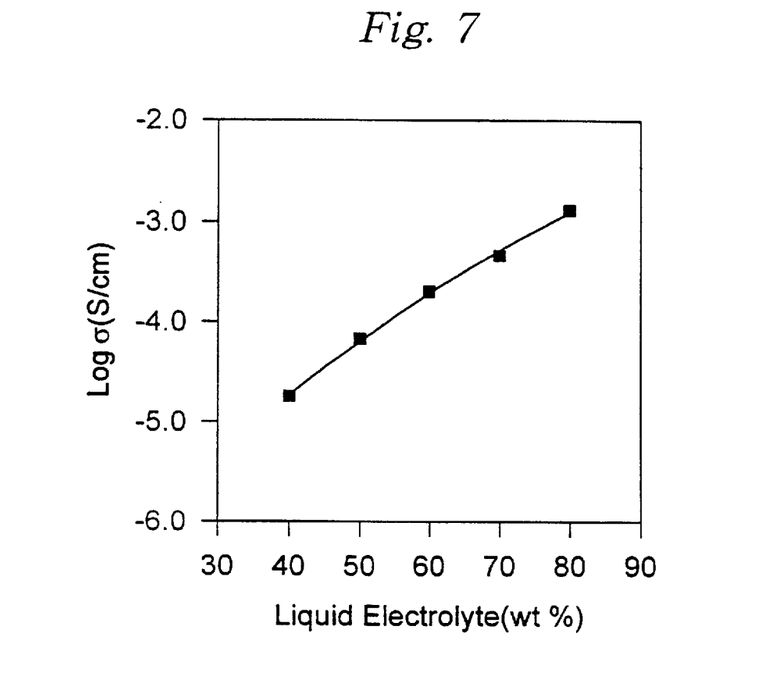
FIG. 7 is a graph showing the ionic conductivities (σ) of the solid polymer electrolyte depending upon the content of liquid electrolyte in Example 15, wherein the solid polymer electrolyte comprises a polymer of poly(acrylonitrile-methyl methacrylate-styrene) composed of acrylonitrile of 57%, methyl methacrylate of 27% and styrene of 16% by mole, and a liquid electrolyte composed of lithium perchlorate and ethylene carbonate/propylene carbonate.

Solid polymer electrolytes were prepared in the same manner as described in Example 14 except that the content of the liquid electrolyte was varied. The ionic conductivities of the electrolytes were shown in FIG. 7.

Example 16

Solid polymer electrolytes were prepared in the same manner as described in Example 14 except that the liquid electrolyte dissolving 1M $LiBF_4$, $LiCF_3SO_3$, $LiPF_6$ or $LiAsF_6$ in a mixture of EC/PC of 1:1 by volume was used. The ionic conductivities of the samples were shown in Table 1.

TABLE 1

| Liquid Electroyte | Ionic Conductivity (S/cm) |
| --- | --- |
| $LiBF_4$ & EC/PC (1:1 by vol.) | $1.2 \times 10^{-3}$ |
| $LiCF_3SO_3$ & EC/PC (1:1 by vol.) | $1.8 \times 10^{-3}$ |
| $LiPF_6$ & EC/PC (1:1 by vol.) | $1.7 \times 10^{-3}$ |
| $LiAsF_6$ & EC/PC (1:1 by vol.) | $1.8 \times 10^{-3}$ |

Example 17

Solid polymer electrolytes were prepared in the same manner as described in Example 14 except that the liquid electrolyte dissolving 1M $LiClO_4$ in a mixture of EC/DMC, EC/γ-BL or EC/DEC of 1:1 by volume was used. The ionic conductivities of the solid polymer electrolytes were presented in Table 2.

TABLE 2

| Liquid Electrolyte | Ionic Conductivity (S/cm) |
| --- | --- |
| 1M $LiClO_4$ & EC/DMC (1:1 by vol.) | $1.2 \times 10^{-3}$ |
| 1M $LiClO_4$ & EC/γ-BL (1:1 by vol.) | $2.3 \times 10^{-3}$ |
| 1M $LiClO_4$ & EC/DEC (1:1 by vol.) | $1.2 \times 10^{-3}$ |

Example 18

Figure 8:
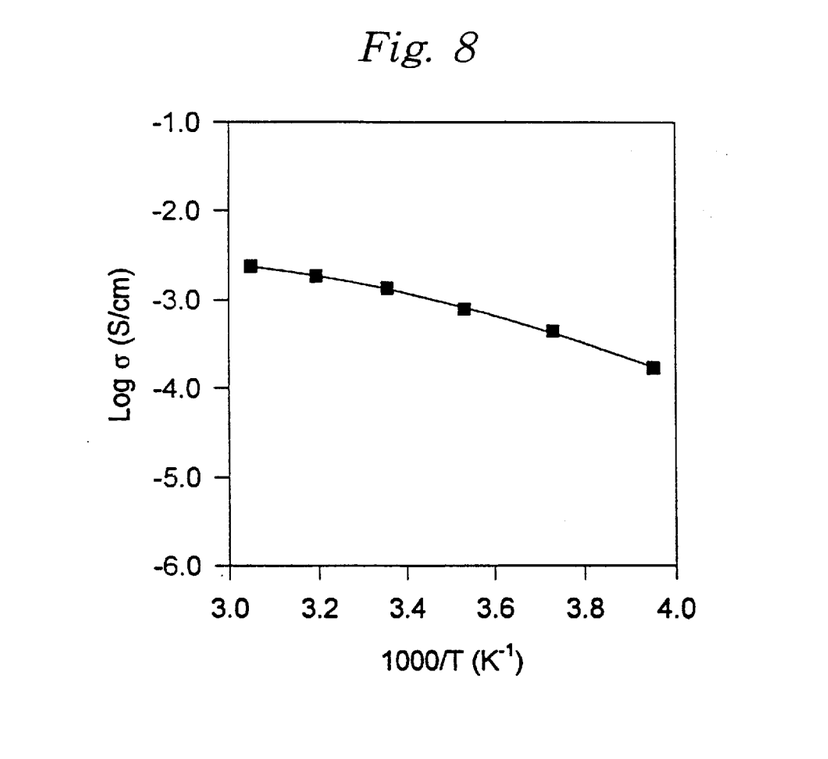
FIG. 8 is a graph showing the ionic conductivities (σ) of the solid polymer electrolyte at the temperature range of −20 to 55° C. in Example 18, wherein the solid polymer electrolyte is prepared from a mixture comprising a liquid polymer electrolyte of a poly(acrylonitrile-methyl methacrylate-styrene) of 30% by weight, and a liquid electrolyte of 70% by weight which composed of 1M of lithium perchlorate and ethylene carbonate/propylene carbonate; and a ceramic filler of silica of 10% by weight per the total weight of the liquid polymer electrolyte.

Terpolymer of 30% by weight, containing acrylonitrile, methyl methacrylate and styrene of 57%, 27% and 16% by mole, respectively, was dissolved in tetrahydrofuran, and liquid electrolyte of 70% by weight composed of 1M lithium perchlorate and ethylene carbonate/propylene carbonate was added. A sticky polymer solution was obtained by stirring the solution. The sticky polymer solution was cast onto a release paper by using a doctor blade, and which was dried to remove tetrahydrofuran to prepare a solid polymer electrolyte. The solid polymer electrolyte was cut to be the size of 2 cm×2 cm. The ionic conductivity of the sample was $1.4 \times 10^{-3}$ S/cm at room temperature. The ionic conductivities of the sample depending on the temperature of $-20 \sim 50°$ C. were shown in FIG. 8.

Figure 9:
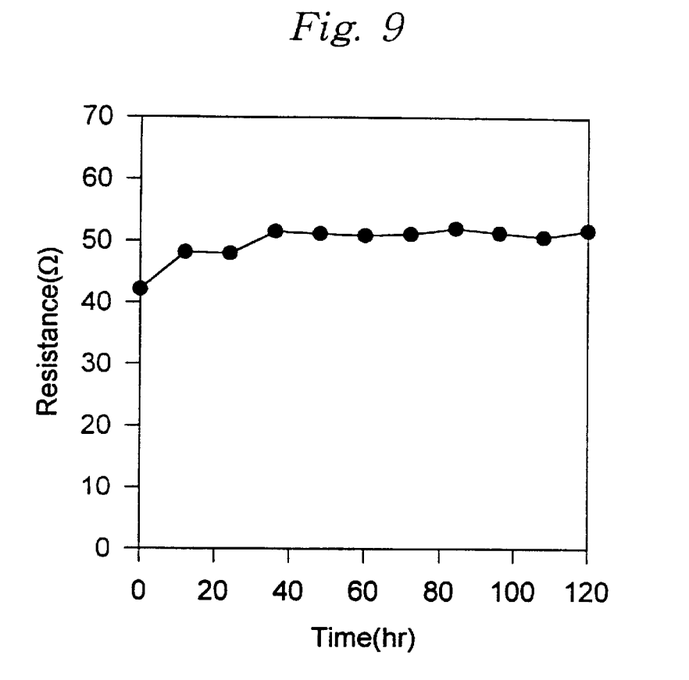
FIG. 9 is a graph showing the interface resistances between a lithium electrode and a solid polymer electrolyte depending upon time, wherein the solid polymer electrolyte is composed of a polymer of poly(acrylonitrile-methyl methacrylate-styrene), a liquid electrolyte composed of lithium perchlorate and ethylene carbonate/propylene carbonate, and a ceramic filler of silica.

The interface resistance of lithium/solid polymer electrolyte was measured with an AC impedance analyzer. The interface resistances of lithium/solid polymer electrolyte depending upon time were presented in FIG. 9. The interface resistances were almost constant regardless of time, which indicated that the passivation phenomenon of the lithium electrode did not occur.

Example 19

Figure 10:
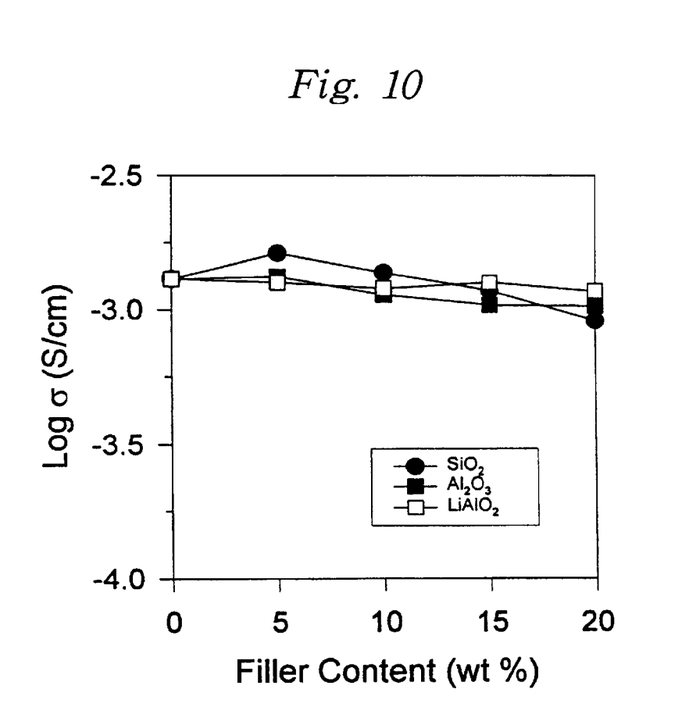
FIG. 10 is a graph showing the ionic conductivities (σ) of the solid polymer electrolyte depending upon the content of a ceramic filler such as silica, alumina or lithium aluminate, wherein the solid polymer electrolyte is composed of a polymer of poly(acrylonitrile-methyl methacrylate-styrene), a liquid electrolyte and a ceramic filler.

Silica was added to the sticky polymer solution of Example 18, varying the content of silica. Solid polymer electrolytes were prepared in the same manner as described in Example 18. The ionic conductivities of the electrolytes were presented in FIG. 10.

Example 20

Solid polymer electrolytes were prepared in the same manner as described in Example 18 except that alumina or lithium aluminate of 0~20% by weight was added to the electrolyte solution of 100% by weight instead of silica. The ionic conductivities of the electrolytes were presented in FIG. 10.

Example 21

Solid polymer electrolytes were prepared in the same manner as described in Example 14 except that the terpolymer contains acrylonitrile, methyl methacrylate and styrene of 47%, 31% and 22% by mole, respectively. The ionic conductivity of the solid polymer electrolyte was $2.0 \times 10^{-3}$ S/cm at room temperature.

Example 22

Terpolymer of 37.5% by weight, containing acrylonitrile, methyl methacrylate and styrene of 47%, 31% and 22% by mole, respectively, was dissolved in tetrahydrofuran, and dibutylphthalate of 62.5% by weight was added. To 100 parts by weight of the terpolymer solution was 15 parts by weight of silica. A sticky polymer solution was obtained by stirring the solution. The sticky polymer solution was cast onto a release paper by using a doctor blade, and which was dried to remove tetrahydrofuran to prepare a thin electrolyte film. The electrolyte film was immersed in ether for over 30 minutes to remove dibutylphtalate and to form a microporous film. The microporous film was immersed in the liquid electrolyte composed of 1M of lithium perchlorate and ethylene carbonate/propylene carbonate. The liquid electrolyte was retained in the microporous film. The ionic conductivity of the solid polymer electrolyte film was $5.3 \times 10^{-4}$ S/cm at room temperature.

Example 23

A solid polymer electrolyte was prepared in the same manner as described in Example 14 except that the terpolymer contains acrylonitrile, methyl methacrylate and styrene of 21%, 72% and 7% by mole, respectively. The ionic conductivity of the solid polymer electrolyte was $9.7 \times 10^{-4}$ S/cm at room temperature.

Example 24

Terpolymer of 11% by weight, containing acrylonitrile, methyl methacrylate and styrene of 54%, 32% and 14% by mole, respectively, was dissolved in tetrahydrofuran, and liquid electrolyte of 89% by weight composed of 1M lithium perchlorate and ethylene carbonate/propylene carbonate was added. To 100 parts by weight of the terpolymer solution was 10 parts by weight of silica added. A sticky polymer solution was obtained by stirring the solution. The sticky polymer solution was cast onto a release paper by using a doctor blade, and which was dried to remove tetrahydrofuran to prepare a solid polymer electrolyte film.

Figure 11:
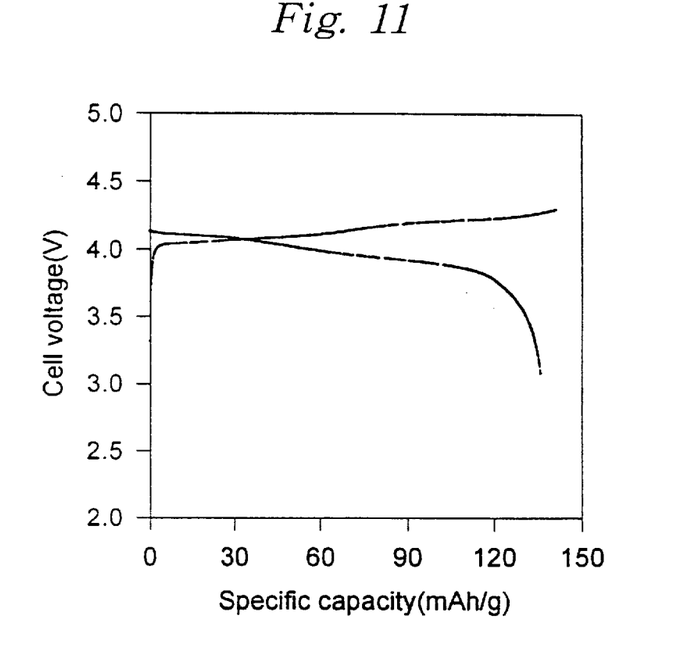
FIG. 11 is a graph showing the charge/discharge for the lithium polymer secondary battery at current density of 0.1 mA/cm$^2$ at the voltage limit between 3.0 and 4.3 V, wherein the lithium polymer secondary battery has a thickness of 0.2 mm and comprises Li(reference electrode)/solid polymer electrolyte/$LiMn_2O_4$(counter electrode) in accordance with Example 24.
Figure 12:
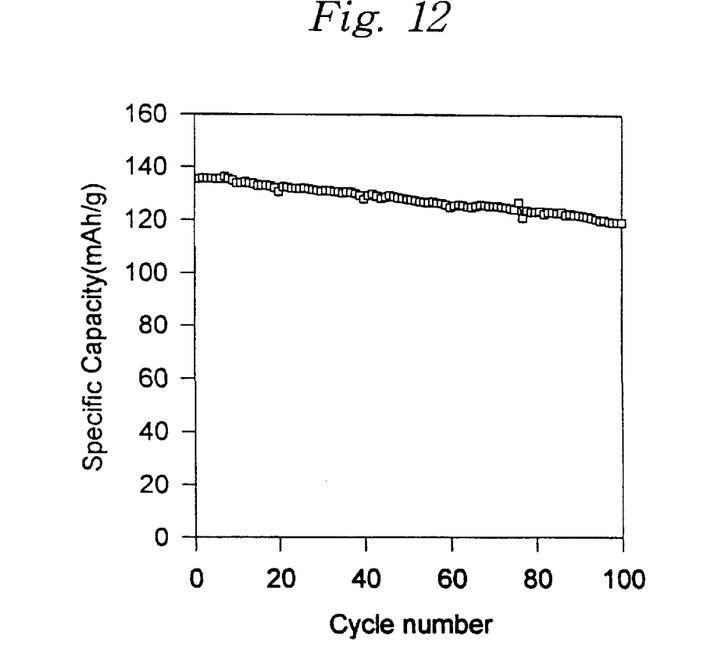
FIG. 12 is a graph showing the discharge capacity of the lithium polymer secondary battery according to the present invention depending upon the cycles at current density of 0.1 mA/cm$^2$ at the voltage limit between 3.0 and 4.3 V.

A slurry was prepared from a ratio of 51: 8: 41 by weight of $LiMn_2O_4$ cathode active material, carbon conductive material and solid polymer electrolyte, and was cast onto an aluminum current collector to form a composite cathode. The solid polymer electrolyte film was sandwiched between the composite cathode and the lithium anode, and then which was laminated, so that a lithium polymer secondary battery having the thickness of 0.2 mm was prepared. The charge/discharge test of the prepared lithium polymer secondary battery was carried out at the voltage between 3.0 and 4.3 V at the current density of 0.1 $mA/cm^2$. The results were shown in FIG. 11. The discharge capacity of the cell was 136 mAh/g, and the efficiency of the charge/discharge was 96%. A graph showing the discharge capacity of the lithium polymer secondary battery depending upon the cycle numbers at the current density of 0 $mA/cm^2$ at the voltage limit between 3.0 and 4.3 V was shown in FIG. 12. The discharge capacity of the cell at the 100th cycle was 120 mAh/g, which was 88% of the initial capacity. It was shown that the solid polymer electrolyte in accordance with the present invention has an ability to apply to the electrolyte material for a lithium polymer secondary battery.

Comparative Example 3

Copolymer of styrene-acrylonitrile(SAN) of 20% by weight, containing acrylonitrile of 29% by weight, was dissolved in tetrahydrofuran, and liquid electrolyte of 80% by weight, composed of 1M of lithium perchlorate and ethylene carbonate/propylene carbonate, was added. A sticky polymer solution was obtained by stirring. The sticky polymer solution was cast onto a release paper by using a doctor blade, and which was dried to remove tetrahydrofuran to prepare a solid polymer electrolyte. The ionic conductivity of the solid polymer electrolyte was $1.4 \times 10^{-3}$ S/cm at room temperature. However, the mechanical property of the polymer electrolyte was poor, therefore it was difficult to obtain a thin electrolyte film having a thickness of 100 µm or less, and also the liquid electrolyte in the polymer electrolyte leaked out from the polymer matrix.

The mechanical property and the ionic conductivity of the solid polymer electrolyte prepared in accordance with the present invention, which comprises a polymer, a liquid electrolyte composed of an aprotic solvent and a lithium salt, and optionally a ceramic filler, can be controlled by varying the contents of the components.

The present invention can be easily carried out by an ordinary skilled person in the art. Many modifications and changes may be deemed to be within the scope of the present invention as defined in the following claims.

What is claimed is:

1. A solid polymer electrolyte comprising:

10~90% by weight of a terpolymer (A) of poly (acrylonitrile-methyl methacrylate-oligooxyethylene ethylether methacrylate); and 90~10% by weight of a liquid electrolyte (B) which is composed of a lithium salt and an aprotic solvent.

2. The solid polymer electrolyte as defined in claim 1 wherein said poly(acrylonitrile-methyl methacrylate-oligooxyethylene ethylether methacrylate) contains acrylonitrile of 20~80 mol %, methyl methacrylate of 20~80 mol % and oligooxyethylene ethylether methacrylate of 5~20 mol %.

3. The solid polymer electrolyte as defined in claim 1 wherein said lithium salt is selected from the group consisting of lithium perchlorate($LiClO_4$), lithium trifluoromethansulfonimide($LiN(CF_3SO_2)_2$), lithium hexafluorolphosphate($LiPF_6$), lithium tetrafluoroborate ($LiBF_4$), lithium trifluoromethansulfonate($LiCF_3SO_3$), lithium hexafluoroarsenate($LiAsF_6$) and a mixture thereof.

4. The solid polymer electrolyte as defined in claim 1 wherein said aprotic solvent is selected from the group consisting of ethylene carbonate, propylene carbonate, dimethylcarbonate, diethylcarbonate, dimethoxy ethane, diethoxy ethane, polyethyleneglycol dimethylether, γ-butyrolactone, tetrahydrofuran and a mixture thereof.

5. The solid polymer electrolyte as defined in claim 1, further comprising a ceramic filler (C) of 5~40 parts by weight per 100 parts by weight of the polymer (A) and liquid electrolye (B).

6. The solid polymer electrolyte as defined in claim 5 wherein said ceramic filler is selected from the group consisting of silica, alumina, lithium aluminate, zeolite and a mixture thereof.

7. A solid polymer electrolyte film which is prepared by forming the solid polymer electrolyte of claim 1 into a porous film.

8. A lithium polymer secondary battery which which is prepared by using the solid polymer electrolyte of claims 1 or the solid polymer electrolyte film of claim 7.

9. A solid polymer electrolyte comprising:

10~90% by weight of a terpolymer (A) which is represented as the following formula (III); and 90~10% by weight of a liquid electrolyte (B) which is composed of a lithium salt and an aprotic solvent:

(III)

where $R_1$ is H or $CH_3$, $R_2$ is an alkyl group, and X is $C_6H_5$, Cl, F, (n = 1 ~ 12).

10. The solid polymer electrolyte as defined in claim 9 wherein said terpolymer is poly(acrylonitrile-methyl methacrylate-styrene).

11. The solid polymer electrolyte as defined in claim 9 wherein said poly(acrylonitrile-methyl methacrylate-styrene) contains acrylonitrile of 10~80 mol %, methyl methacrylate of 10~80 mol % and styrene of 5~50 mol %.

12. The solid polymer electrolyte as defined in claim 9 wherein said lithium salt is selected from the group consisting of lithium perchlorate($LiClO_4$), lithium trifluoromethansulfonimide($LiN(CF_3SO_2)_2$), lithium hexafluorophosphate($LiPF_6$), lithium tetrafluoroborate ($LiBF_4$), lithium trifluoromethansulfonate($LiCF_3SO_3$), lithium hexafluoroarsenate($LiAsF_6$) and a mixture thereof.

13. The solid polymer electrolyte as defined in claim 9 wherein said aprotic solvent is selected from the group consisting of ethylene carbonate, propylene carbonate, dimethylcarbonate, diethylcarbonate, dimethoxy ethane, diethoxy ethane, polyethyleneglycol dimethylether, γ-butyrolactone, tetrahydrofuran and a mixture thereof.

14. The solid polymer electrolyte as defined in claim 9, further comprising a ceramic filler (C) of 5~40 parts by weight per 100 parts by weight of the terpolymer (A) and liquid electrolyte (B).

15. The solid polymer electrolyte as defined in claim 14 wherein said ceramic filler is selected from the group consisting of silica, alumina, lithium aluminate, zeolite and a mixture thereof.

16. A solid polymer electrolyte film which is prepared by forming the solid polymer electrolyte of claim 9 into a porous film.

17. A lithium polymer secondary battery which is prepared by using the solid polymer electrolyte of claims 9 or the solid polymer electrolyte film of claim 16.

18. A solid polymer electrolyte film according to claim 7, wherein the porous film is a polyethylene film or a polypropylene film.

19. A solid polymer electrolyte film according to claim 16 wherein the porous film is a polyethylene film or a polypropylene film.

* * * * *